United States Patent Office 3,725,244
Patented Apr. 3, 1973

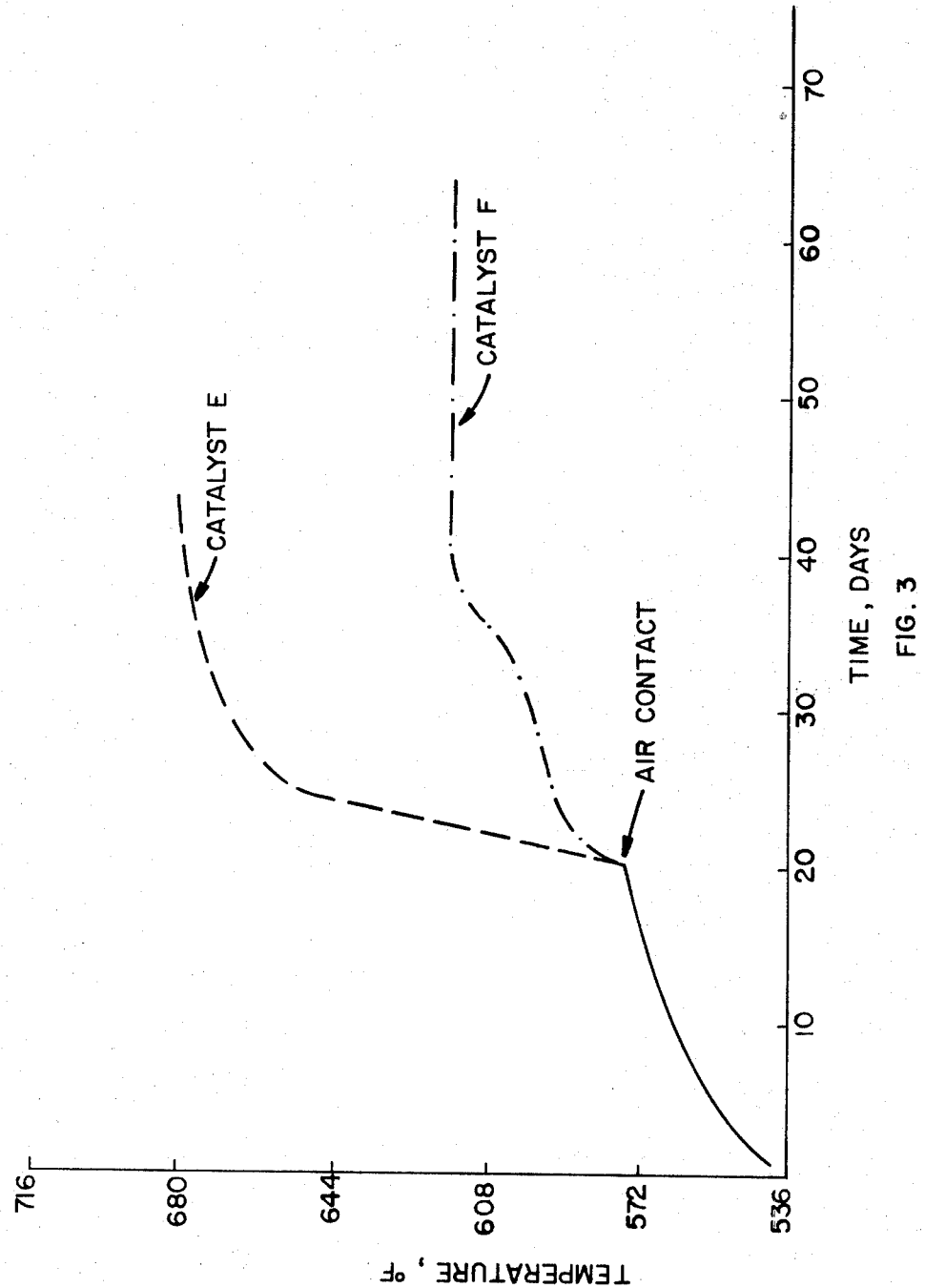

3,725,244
HYDROCRACKING PROCESS WITH FLUORINE TREAT TO AVOID CONDENSED POLYAROMATICS
Hans U. Schutt, Lafayette, Calif., assignor to Shell Oil Company, Houston, Tex.
Filed Oct. 13, 1971, Ser. No. 188,408
Int. Cl. C10g 9/16, 13/06; B01j 11/80
U.S. Cl. 208—59          8 Claims

ABSTRACT OF THE DISCLOSURE

A two-stage hydrocracking process employing recycle of high boiling, second stage product to second stage feed and a second stage catalyst containing an iron group hydrogenative metal supported on an amorphous silica-alumina-fluorine acid-acting base is improved to avoid formation of polyaromatic compounds in the high boiling product by
(a) first discontinuing the flow of hydrocarbon feed to the second-stage;
(b) then contacting the second stage catalyst with oxygen;
(c) contacting the oxidized second stage catalyst with a sulfiding compound at conditions to convert the iron group metal component to a sulfide form;
(d) contacting the second stage catalyst with from about 0.001% to about 0.2% wt. of catalyst of fluorine in the form of a vapor phase fluoriding compound at a temperature of from 350° to 1100° F.; and
(e) re-establishing the flow of hydrocarbon feed to the second-stage.

BACKGROUND OF THE INVENTION

The well-known hydrocracking process is widely employed to convert high boiling hydrocarbon material to lower boiling hydrocarbon material. Typically, the hydrocarbon feed is a petroleum distillate boiling in the gas oil range or higher and it is converted to useful liquid products such as hydrocarbons boiling in the gasoline or turbine fuel range. The hydrocracking process is distinguished from the catalytic cracking process by the production of a more saturated product and the process is distinguishable because the hydrogen present in the reaction zone suppresses coke formation which reactivates the catalyst by covering active sites. Hydrocracking catalyst are polyfunctional. The catalysts contain a metal with hydrogenating activity, typically a Group VIII or Group VI metal, or combinations thereof, supported on a refractory metal oxide base that has acid activity. Hydrocracking catalysts are generally more fragile than cracking catalysts because they not only must perform both cracking and hydrogenating functions but the balance between hydrogenation and cracking must be maintained.

Hydrocracking processes characteristically are fixed bed processes wherein long periods of conversion are followed by short regeneration periods as distinct from the short conversion and regeneration cycles are are typical of a fluidized catalytic cracking process. Hydrocracking processes generally employ two stages, the first stage primarily employed as a feed conditioning stage while the second stage is primarily the hydrocracking stage. The second stage catalyst may employ either amorphous acid-acting supports, or crystalline acid-acting supports which are generally known as zeolites. Although the use of crystailline supports avoids many problems, catalysts on amorphous supports are less expensive and capable of being employed in economically viable processes if the problems characteristic of amorphous catalysts are avoided.

Hydrocracking catalysts are deactivated by a number of agents. Typically, gross coke production deactivates a catalyst by covering the active sites. Hydrocracking catalysts are also deactivated by the production of ammonia from the nitrogen in the feed in that ammonia neutralizes the acid sites with a corresponding reduction in catalytic activity. Other materials also poison the catalyst, such as water vapor at high temperatures and specific metal contaminants. Deactivation due to coke lay down and ammonia neutralization can be overcome by oxidative regeneration; specifically, treating the catalyst with oxygen at a high enough temperature to cause combustion of the carbonaceous coke and of the ammonia whereby they are removed as a vapor phase. However, it has been found that after several oxidative regeneration a second-stage hydrocracking catalyst supported on an amorphous acid-acting base has a tendency to form condensed polyaromatic compounds from the treated charge to the second stage of the process. It is not known whether this effect is cumulative or whether it suddenly appears after several regenerations, but at any rate condensed polyaromatic compounds that are not in the feed appear in the product from such a process after a number of regeneration cycles.

The presence of condensed polyaromatic compounds can be readily discerned by examining the higher boiling portions of the hydrocracking process product, i.e., the portion of the product that is recycled to the second-stage feed, because of the dark color which arises when polyaromatic compounds are present, even in minor amounts, e.g., less than 0.01% wt. Since it is desirable to recycle higher boiling products from the hydrocracking process to extinction, the production of polyaromatic compounds causes them to accumulate in the recycle, and these polyaromatic compounds are catalyst poisons. The polyaromatic compounds tend to lay down coke on the catalyst; however, gross coke laydown is not the cause of catalyst poisoning from polyaromatic compounds. Rather, it has been found that the coke laydown is selective to the active sites on the catalyst in that even very small quantities of polyaromatic compounds in the feed, that is, the recycle portion of the feed, quickly deactivate the second stage cracking catalyst so that the need for regeneration is accelerated. The tendency for oxidatively regenerated hydrocracking catalysts to form polyaromatic compounds severly restricts opportunities to use the very beneficial and economic species of hydrocracking wherein the hydrocracking catalyst comprises a hydrogenating metal component supported on an acid-acting amorphous support and where the feed to the process is either converted to materials boiling in the desirable range or recycle to extinction.

THE INVENTION

This invention involves an improvement in a two-stage hydrocracking process having a second stage catalyst containing an amorphous silica-alumina-fluorine acid-acting base and an iron group metal hydrogenative component which, through exposure to oxygen, has acquired the capacity to form condensed polyaromatic compounds from a normal hydrocracking feed at normal hydrocracking conditions. Although the exposure of catalyst to oxygen generally results from oxidative regeneration of the catalyst, accidental exposure to oxygen may occur before the catalyst is deactivated, e.g., when the process is shut down for emergency reasons and the reactor is opened to the air during a run. The process of the invention is also effective in these instances. The process of this invention includes the steps of discontinuing the flow of hydrocarbon feed to the hydrocracking process, contacting the catalyst with oxygen, contacting the oxidized catalyst with a sulfur-containing compound at conditions to convert the hydrogenative metal to a sulfide form, contacting the catalyst with a flourine-containing gas in an amount of fluorine corresponding to 0.001% to 0.2% by weight of catalyst, and thereafter resuming the flow of hydrocarbon feed to the process under conditions to effect hydrocracking.

BRIEF DESCRIPTION OF DRAWINGS

The invention will be more clearly understood when described in connection with the accompanying drawings in which hydrocracking activity (temperature requirement to effect a given conversion) is plotted against catalyst age.

FIG. 3 shows the effects of accidental exposure to air on catalyst deactivation rate with and without the claimed process.

Figure 1:
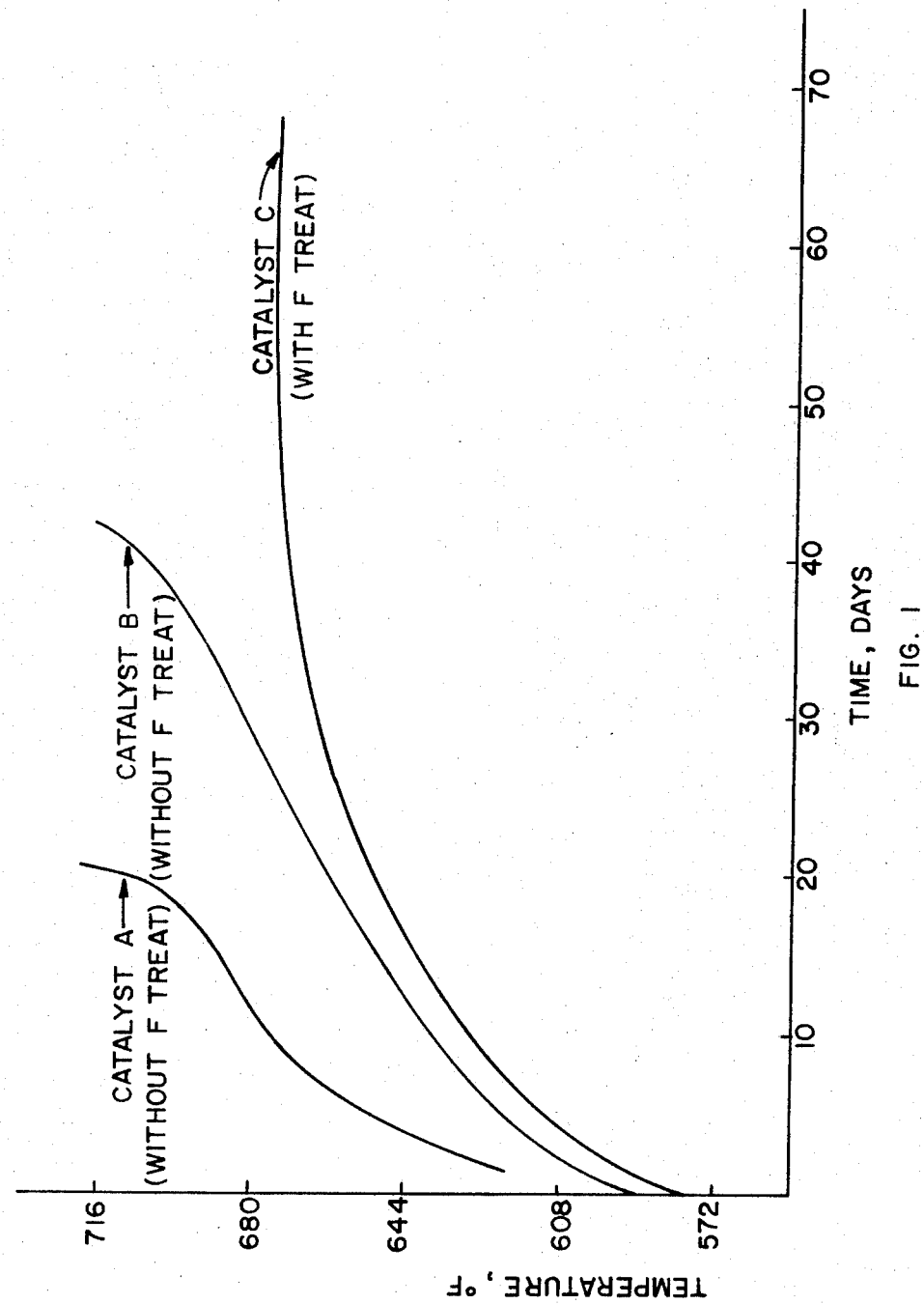
FIG. 1 compares the catalyst deactivation rate of the claimed process with conventional processes using oxidative catalyst regeneration.

These figures are discussed in greater detail in the examples, below.

DETAILED DESCRIPTION

Hydrocracking catalyst activity as discussed herein is the temperature required to achieve a specified conversion of feed to lower boiling hydrocarbons in the hydrocracking process. The lower the temperature requirement the more active the catalyst. Catalyst stability is indicated by the rate of temperature increase required to give a fixed conversion under specified hydrocracking conditions. The more stable catalysts will show a lower rate of temperature increase which will result in longer processing runs.

Typically, when the activity of the catalyst has dropped off to an uneconomic degree the flow of feed to the process is stopped and the catalyst bed is stripped of hydrocarbon as much as possible by continued circulation of hydrogen. The hydrogen is then stripped from the catalyst with an inert gas according to conventional methods after which the catalyst is regenerated by contact with oxygen, usually air diluted with nitrogen to maintain the oxygen concentration low enough to avoid excessive temperatures in the catalyst bed during oxidation. All of the foregoing is conventional. As a result of the oxidative regeneration the hydrogenative metal portion of the catalyst is an oxide form and, if reduced in that form the metal tends to agglomerate. For a variety of reasons and also to avoid this problem, the metal portion is sulfided, typically by contacting the catalyst with hydrogen sulfide in hydrogen-rich gas at a relatively low temperature.

The type of sulfur-containing compound used for sulfiding is not critical. Concentrations of from 0.1 to 20% vol. $H_2S$ in hydrogen are especially suitable. Temperatures are generally raised from about 400° F. to at least about 650° F. and maintained at the final level for several hours until at least about 1% wt. sulfur is added to the catalyst. After the catalyst is sulfided the flow of hydrogen through the system is continued without $H_2S$. In accordance with this invention, a small amount of fluorine, in the form of a vapor phase fluorine compound, usually an organic fluorine compound, is introduced into the hydrogen and the catalyst is treated with this mixed gas.

Although the foregoing process is described in terms of a number of serially performed process steps, some of these steps may be combined while others may not. It is essential that the flow of charge stock to the process be terminated before any other process step is effected. It has been found that fluoriding the catalyst by introducing a decomposable fluorine compound into the liquid feed is not effective to achieve the results obtained by the process claimed herein. The step wherein the catalyst is contacted with oxygen must necessarily follow termination of the flow of charge stock to the hydrocracking process. The sulfiding step and the fluoriding step, however, may be combined, and in fact, the only requirement is that the sulfiding step be accomplished prior to the time that the catalyst is exposed to sulfur-free hydrogen at high temperatures. The sulfiding step and the fluoriding step may also be accomplished sequentially in which case the sulfiding step must precede the fluoriding step. The final step of resuming the feed of hydrocarbon to be hydrocracked to the process is subsequent to the sulfiding step and the fluoriding step.

It has been found that liquid-phase fluorine treatment of a hydrocracking catalyst in the presence of feed does not suppress the formation of highly condensed polyaromatic compounds in hydrocracked product. Thus, the treatment involves something different than conventional catalyst fluoriding. The fluorine added to the catalyst by this invention is insignificant as a catalyst component, e.g. to add cracking activity, and the treatment must be carried out in the vapor phase. A suitable range of catalyst fluorine additions is from about 0.001% to about 0.2% wt. Although the 0.2% wt. is not really a critical upper limit, no additional benefit in avoiding polyaromatics is realized at fluorine additions above about 0.2% wt. and higher fluorine additions may undesirably increase the acid-acting activity of the catalyst. Any fluorine compound which is readily vaporized at about 350–1100° F. is suitable for use in the activation treatment. Examples of such compounds are fluorine, hydrogen fluoride, difluoroethane (DFE), etc. Difluoroethane is preferred because of its ease in handling. The concentration of fluorine in the gas stream is suitable in the range from about 0.001% v. to 1% v., although higher concentrations may be used. However, if lower concentrations are used it is necessary to extend the treatment time while high concentrations can cause corrosion problems. A concentration of about 0.02% v. DFE in the sulfiding gas stream is preferred. The treatment is generally conttinued for a period of 1 to 10 hours, although longer periods may be used. The treating time will vary with gas flow which can vary from 100 to 2000 volumes of gas per volume of catalyst per hour (vol./vol./hr.). Pressure is not critical, but will generally vary from 15 to 2000 p.s.i.

Suitable feedstocks for second-stage hydrocracking processes employing these catalysts include any hydrocarbon boiling above the boiling range of the desired product where the nitrogen content is below about 50 p.p.m. Low nitrogen content feedstocks are generally obtained by hydrotreating in a first-stage process. For gasoline production, hydrocarbon distillates boiling in the range of about 390–950° F. are preferred. Such distillates may have been obtained either from distillation of crude oils, coal tars, etc., or from other processes generally applied in the oil industry such as thermal or catalytic cracking, visbreaking, deasphalting, or combinations thereof.

Appropriate operating conditions for a second-stage hydrocracking process include temperatures in the range of about 480° F. to about 750° F., hydrogen partial pressures of about 500 to 2000 p.s.i.g., liquid hourly space velocities (LHSV) of about 0.2 to about 10, preferably 0.5 to 5, and hydrogen/oil molar ratios of about 5 to 50. Feed can be introduced to the reaction zone as a liquid, vapor or mixed liquid-vapor phase depending upon the temperature, pressure and amount of hydrogen mixed with the feed and the boiling range of the feedstock utilized. The hydrocarbon feed, including fresh feed as well as recycled high boiling hydrocracked product, is usually introduced into the reaction zone with a large excess of hydrogen. Excess hydrogen is generally recovered from the reaction zone effluent and recycled to the reactor together with additionad make up hydrogen.

The following examples illustrate the invention and its advantages, but are not intended to limit its scope.

EXAMPLE I

This example compares regeneration employing the vapor phase fluorine treatment of the invention with a conventional single flame front high temperature level oxidative regeneration of a second-stage hydrocracking catalyst and demonstrates the deleterious effect polyaromatic compounds have on catalytic activity and stability as well as how their formation is avoided by this invention.

A commercial catalyst containing 3.2% wt. W, 4.7% Ni and 3.2% wt. F supported on a base of amorphous 22% wt. $Al_2O_3$/78% wt. $SiO_2$ gel was deactivated by normal operation in a second-stage hydrocracking operation. Part of this catalyst (Catalyst A) was oxidatively regenerated by contacting it in a bed at 400 p.s.i.g. with 0.5% v. oxygen in nitrogen at a flow rate of 500 volumes of gas per volume of catalyst per hour (vol./vol./hr.) while maintaining a single high temperature level of 950° F. for essentially complete coke burn-off. Catalyst A was then sulfided by contacting it with 10% v. $H_2S$ in hydrogen at a flow rate of 600 vol./vol./hr. while raising the bed temperature from 390° F. to 710° F. The temperature was then maintained at 710° F. for about 10 hours while continuing the flow of $H_2S$-containing gas.

Another part of the deactivated catalyst (Catalyst B) was oxidatively regenerated by the same conditions as for Catalyst A except that the carbon burn off was carried out at 850° C.

Still another part of the deactivated catalyst (Catalyst C) was oxidatively regenerated by the same conditions as for Catalyst B except that at the end of the sulfiding step 0.02% v. difluoroethane was added to the gas stream for an additional 5-hour period.

The three catalysts were then used to hydrocrack a 40/60 mixture of catalytically cracked light and heavy gas oils having a 27° API gravity and a boiling range of about 480–750° F. which had been hydrotreated to a nitrogen content of 3–4 p.p.m. Hydrocracking conditions were: 1800 p.s.i.g., 1.0 LHSV, 10/1 hydrogen-to-oil molar ratio and 1.25 combined feed ratio to obtain material boiling below 385° F. About 7.5 p.p.m. fluorine and 0.18% w. sulfur were added to the fresh feed. The hydrocracked product from Catalyst A contained highly condensed polyaromatics as indicated by dark-colored material (ASTM D–1500 color-index above about 2.0) boiling above 385° F., which upon storing also developed minor amounts of a dark precipitate, which was recycled to the conversion process. This catalyst required a conversion temperature of 715° F. after 21 days on stream. Catalyst B required a conversion temperature of 715° F. after 42 days on stream. Catalyst C produced a light colored recycle stock (ASTM D–1500 color-index about 0.5) throughout the run and required a conversion temperature of only 675° F. after 75 days on stream.

The catalyst activity and stability for the three runs are compared in FIG. 1. The Catalyst A run shows that catalytic activity and stability are greatly decreased by recycling drak-colored high-boiling hydrocarbon oils containing condensed polyaromatics to the second-stage hydrocracking catalyst. The Catalyst C run shows that the hydrocarcking process is greatly improved by the vapor-phase fluorine treatment of the invention.

EXAMPLE II

This example demonstrates the advantages of the invention as applied to a hydrocracking catalyst which has been used in several processing cycles, each followed by an improved two-step lower temperature oxidative regeneration. The two-step oxidative regeneration procedure initially suppresses the formation of condensed polyaromatics in the hydrocracked product, but after several regenerations polyaromatics are again formed. The vapor phase fluorine treatment of the invention at this point restores catalyst activity and stabiliy.

Figure 2:
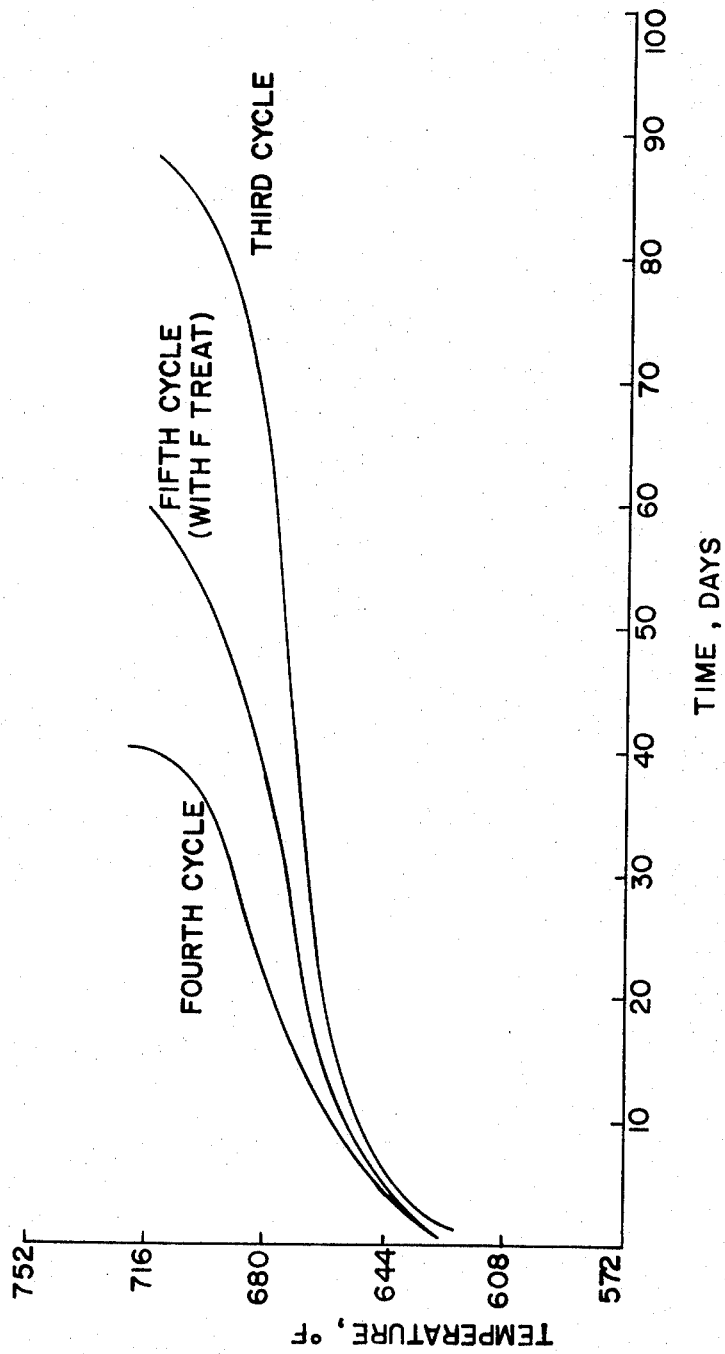
FIG. 2 compares the catalyst deactivation rate of the claimed process with a hydrocracking process employing an improved two-temperature stage oxidative regeneration sequence after several regeneration cycles.

A commercial catalyst (Catalyst D) having a composition similar to Catalyst A of Example I was deactivated in three successive processing cycles each followed by a two-step lower-temperature oxidative regeneration. This regeneration consisted of contacting the catalyst at 400 p.s.i.g. with 0.5%, v. oxygen in nitrogen at a flow rate of 500 vol./vol./hr. at catalyst bed temperatures between 660° F. and 750° F. for 20 hours, then raising the catalyst bed temperature to 840° F. and maintaining the gas flow for 25 hours. In each processing cycle, the catalyst was used to hydrocrack the catalytically cracked mixed gas oil feed of Example I under the same conditions. During the fourth processing cycle dark-colored recycle stock (containing condensed polyaromatics) was observed. Dark recycle stock had not been observed during any of the preceding cycles. The temperatures required to achieve the desired conversion during these cycles are shown in FIG. 2. Catalyst activity declined rapidly during the fourth processing cycle thereby leading to a conversion temperature requirement of 716° F. after only 40 days on stream.

At this point, the catalyst was again oxidatively regenerated and resulfided as indicated above. The catalyst was then subjected to a vapor-phase fluorine treatment by passing 900 vol./vol./hr. of 0.02% v. difluoroethane in hydrogen through the bed at 707° F. for 6 additional hours at 100 p.s.i.g. pressure. Upon resumption of the hydrocracking operation for the fifth processing cycle, light-colored recycle stocks were again produced. As shown in FIG. 2, catalyst activity was much improved over the previous cycle, leading to a 9° F. lower conversion temperature requirement than for the fourth processing cycle after about 17 days on stream, with the temperature difference between cycles four and five increasing as time went on. A conversion temperature requirement of 716° F. was not reached until 60 days on stream. This improvement constitutes a 50% extension of catalyst life time over the fourth cycle.

EXAMPLE III

This example demonstrates the effect of a vapor phase fluorine treatment on a partially spent second-stage hydrocracking catalyst which, after accidental exposure to air, started to produce condensed polyaromatics in the portion of the hydrocracked product boiling above 385° F.

For this test a laboratory prepared catalyst containing 6% wt. Ni and 2% wt. F on a base of 22% wt. $Al_2O_3$/78% wt. $SiO_2$ was used to hydrocrack a hydrotreated 50/50 catalytically cracked light/heavy gas oil feed mixture (29 API; 460–130° F. boiling range; 3 p.p.m. nitrogen). Operating conditions were 1800 p.s.i.g.; 1.0 LHSV, 1.25 CFR and 10/1 $H_2$/oil molar ratio. During operation, 1% wt. sulfur and 7.5 p.p.m. fluorine were added to the fresh feedstock. The temperature required to achieve a 67% v. conversion of feedstock to products boiling below 385° F. was used as the measure of catalyst activity. After 21 days of operation at these conditions a conversion temperature of 578° F. was required. At this point, the feed was discontinued and the catalyst was cooled and exposed to air for several hours at ambient temperatures. Part of the original catalyst charge (Catalyst E) was contacted with hydrogen at a flow rate of 600 vol./vol./hr. and a pressure of 100 p.s.i.g. while raising the bed temperature from 390° F. to 750° F. and maintaining the temperature of 750° F. for 5 hours. Catalyst E was then again used to hydrocrack the same feed under identical conditions. Normally hydrogen contacting of well-sulfided catalysts at elevated temperatures for extended periods of time improves catalytic activity, at least temporarily. However, when Catalyst E time was brough back on stream at 578° F., highly condensed polyaromatics were immediately produced as indicated by dark-colored recycle stock (ASTM color-above about 2.0). As shown in FIG. 3, catalyst activity declined so rapidly thereafter that the conversion temperature requirement rose to 682° F. after only 42 days of total processing time.

The remaining portion of the partially spent, air-exposed catalyst (Catalyst F) was tested under the same hydrocracking operating conditions after having been treated under the same conditions as Catalyst E except that the hydrogen contained 0.02% v. difluoroethane. When Catalyst F was brought back on stream at 578° F., polyaromatics were not present in the product as indicated by light-colored recycle stock (ASTM color—about 0.5). FIG. 3 shows that the catalyst activity decline rate was much lower than for Catalyst E with a conversion temperature requirement of only 618° F. after 42 days of total processing time.

It is apparent from these experiments that a vapor-phase fluorine treatment of the partially spent, air-exposed hydrocracking catalyst in the absence of feed prevented the formation of condensed polyaromatics in the reaction zone and improved catalytic activity (lower temperature requirement) by 64° F. within 21 days of operation after the treatment.

EXAMPLE IV

This example demonstrates that contacting a fresh catalyst with the amount of a gaseous fluorine compound employed in this invention in the absence of feed does not increase catalytic activity. It is essential that the catalyst be producing condensed polyaromatics in the hydrocracked product for the treatment of the invention to be effective.

A fresh commercial catalyst comprising 3.1% wt. W, 4.9% wt. Ni and 3.4% wt. F on a base of 22% wt. $Al_2O_3$/ 78% wt. $SiO_2$ was used for these tests. Part of this catalyst (Catalyst G) was dried and calcined in air at 930° F. for 10 hours. The catalyst was then sulfided by contact with a stream of dry 20% v. $H_2S$-in-hydrogen at 100 p.s.i.g. at a flow rate of 1200 vol./vol./hr. while raising the temperature from 390° F. to 930° F. at the rate of 54° F./hour. Sulfiding was continued at 930° F. for about 6 hours. Another part of the catalyst (Catalyst H) was treated in the same manner as Catalyst G except that the $H_2S$-in-hydrogen gas also contained 0.08% v. difluoroethane.

The activity of each catalyst was determined by hydrocracking a catalytically cracked heavy gas oil hydrotreated to 3 to 4 p.p.m. nitrogen (30° API; boiling range about 450–750° F.) at 0.67 liquid hourly space velocity (LHSV), 1500 p.s.i.g. pressure, and 10/1 hydrogen to oil molar ratio. About 5 p.p.m. fluorine and 0.18% v. sulfur were added to the feed. The temperature required to achieve a 67% v. conversion of feedstock to products boiling below 385° F. was selected as a measure of catalyst activity. The results at the end of 80 hours were 518° F. for catalyst G and 523° F. for catalyst H, indicating that catalytic activity is not improved by a gas-phase fluorine treatment per se.

In summary, the foregoing description and examples demonstrate that oxidative regeneration of second stage hydrocracking catalysts containing iron group metals supported on amorphous silica-alumina-fluorine bases causes irreversible loss of catalytic activity of a specific type. This loss of activity is manifested by production of polyaromatic compounds that are so high boiling that they accumulate in the portion of the product that is recycled to the process feed. The polyaromatic compounds are very specific poisons because very small quantities of these compounds cause rapid decline in catalyst activity.

By the process of this invention, the oxidatively regenerated catalyst is, among other steps, treated with a very small amount of fluorine, much less than an amount that could contribute by its own presence to the gross catalytic activity and an amount that is almost undetectable in the catalyst by ordinary analytical techniques, and because of this treatment the character of the catalyst is changed so that it doesn't produce polyaromatic compounds during processing of the charge.

What is claimed is:

1. In a two-stage hydrocracking process employing a second stage catalyst containing an amorphous silica-alumina-fluorine acid-acting base and an iron group metal hydrogenative component and in which at least a portion of the higher boiling part of the second-stage product stream is recycled as a part of the feed to said second-stage and in which the process is periodically shut down for reactivation of the catalyst, the improvement in reactivation of the second stage catalyst to avoid subsequent formation of polyaromatic compounds in the higher boiling portion of the hydrocracked product which comprises:
   (a) discontinuing the flow of hydrocarbon feed to the second-stage;
   (b) then contacting the second stage catalyst with oxygen;
   (c) contacting the oxidized second stage catalyst with a sulfiding compound in the presence of hydrogen at conditions to convert the iron group metal components to a sulfide form;
   (d) contacting the second stage catalyst with from about 0.001% to about 0.2% wt. of catalyst of fluorine in the form of a vapor phase fluorine compound at a temperature of from 350° F. to 1100° F.; and
   (e) re-establishing the flow of hydrocarbon feed to the second stage.

2. The process of claim 1 wherein the catalyst is contacted with oxygen under conditions to effect oxidative regeneration.

3. The process of claim 2 wherein the steps of contacting the catalyst with a sulfur-containing compound and a fluorine-containing gas are carried out simultaneously.

4. The process of claim 2 wherein the fluorine-containing gas comprises hydrogen and an organic fluorine compound that decomposes at contacting conditions.

5. The process of claim 2 wherein the fluorine-containing compound is difluoroethane.

6. The process of claim 2 wherein the fluorine-containing gas flow rate is at least 100 volumes of gas per volume of catalyst per hour.

7. The process of claim 2 wherein the hydrogenative component is from about 3–7% wt. nickel and the refractory oxide support contains from about 70–90% wt. silica, from about 30–10% wt. alumina, and from about 0.1 to about 7% wt. fluorine.

8. The process of claim 7 wherein the catalyst also contains from about 1–15% wt. tungsten.

References Cited

UNITED STATES PATENTS 3,505,208   4/1970   Vaell _____ 208—111
3,554,898   1/1971   Wood et al. _____ 208—59
3,673,108   6/1972   Schutt _____ 252—411 R DELBERT E. GANTZ, Primary Examiner G. E. SCHMITKONS, Assistant Examiner U.S. Cl. X.R.

208—48 R, 111; 252—415, 441